July 26, 1955 W. W. BOELENS 2,714,157

RADIO RECEIVING CIRCUIT

Filed Dec. 20, 1949 2 Sheets-Sheet 1

INVENTOR.
WILLEM WIGGER BOELENS.
BY Fred M. Vogel
AGENT.

RADIO RECEIVING CIRCUIT

Filed Dec. 20, 1949 2 Sheets-Sheet 2

INVENTOR.
WILLEM WIGGER BOELENS.
BY
Fred M. Vogel
AGENT.

2,714,157
Patented July 26, 1955

2,714,157

RADIO RECEIVING CIRCUIT

Willem Wigger Boelens, Eindhoven, Netherlands, assignor to Hartford National Bank and Trust Company, Hartford, Conn., as trustee Application December 20, 1949, Serial No. 133,990
Claims priority, application Netherlands January 27, 1949
1 Claim. (Cl. 250—20)

This invention relates to series-connected apparatus for wireless receivers, for the reception of frequency-modulated oscillations. The series-connected apparatus is required to convert an incoming frequency-modulated oscillation into a detected oscillation, with the use of which the low-frequency stage or stages of an existing wireless receiver can be driven. For this purpose it comprises a signal input circuit such as an aerial, a mixing stage and several amplifying stages, means by which undue amplitude modulation of the incoming oscillations is effectively suppressed, and a frequency detector comprising a discriminator network and rectifying means.

A satisfactory series-connected apparatus has to meet the requirement of being simple and compact in construction. For this purpose the apparatus is fed directly from the mains, so that a costly and bulky supply transformer is avoided. The discharge tubes of the apparatus are, for example, constructed for direct-voltage and alternating-voltage supply, so-called U-tubes.

The difficulty experienced in this connection resides in the fact that the chassis ("earth") of the series apparatus has a determined voltage relatively to the supply mains. If the chassis of the existing wireless receiver is earthed, or if the latter does not comprise a supply transformer, the two chassis will, in general, have relative voltage differences, particularly low-frequency alternating voltage differences. These voltage differences cause a hum in the output of the series apparatus and thus, low frequency blocking of these voltage differences must be provided in the series apparatus.

Simply, this low-frequency blocking could be effected by including a blocking transformer in the output of the series apparatus. Such a transformer, however, is even more expensive than and almost as bulky as a supply transformer. Low-frequency separation by blocking condensers in the output circuit of the series apparatus cannot be carried out in practice, since such condensers were required to pass the low-frequency detected signal voltage and to block the alternating mains voltage.

The present invention provides a solution of this problem, without using a costly supply transformer or an even more costly low-frequency blocking transformer by providing the blocking after the last amplifying tube in the series apparatus at a point where only intermediate-frequency voltages are present.

According to the invention, coupling elements are provided in the series connected apparatus before the input of the rectifying circuit of the frequency detector and after the anode impedance of the amplifying tube preceding this frequency detector, said coupling elements providing a blocking of the low-frequency between the anode circuit of the amplifying tube and the rectifying circuit.

In order that the invention may be readily carried into effect, a number of examples will now be described in detail with reference to the accompanying drawings of which:

Figure 1:
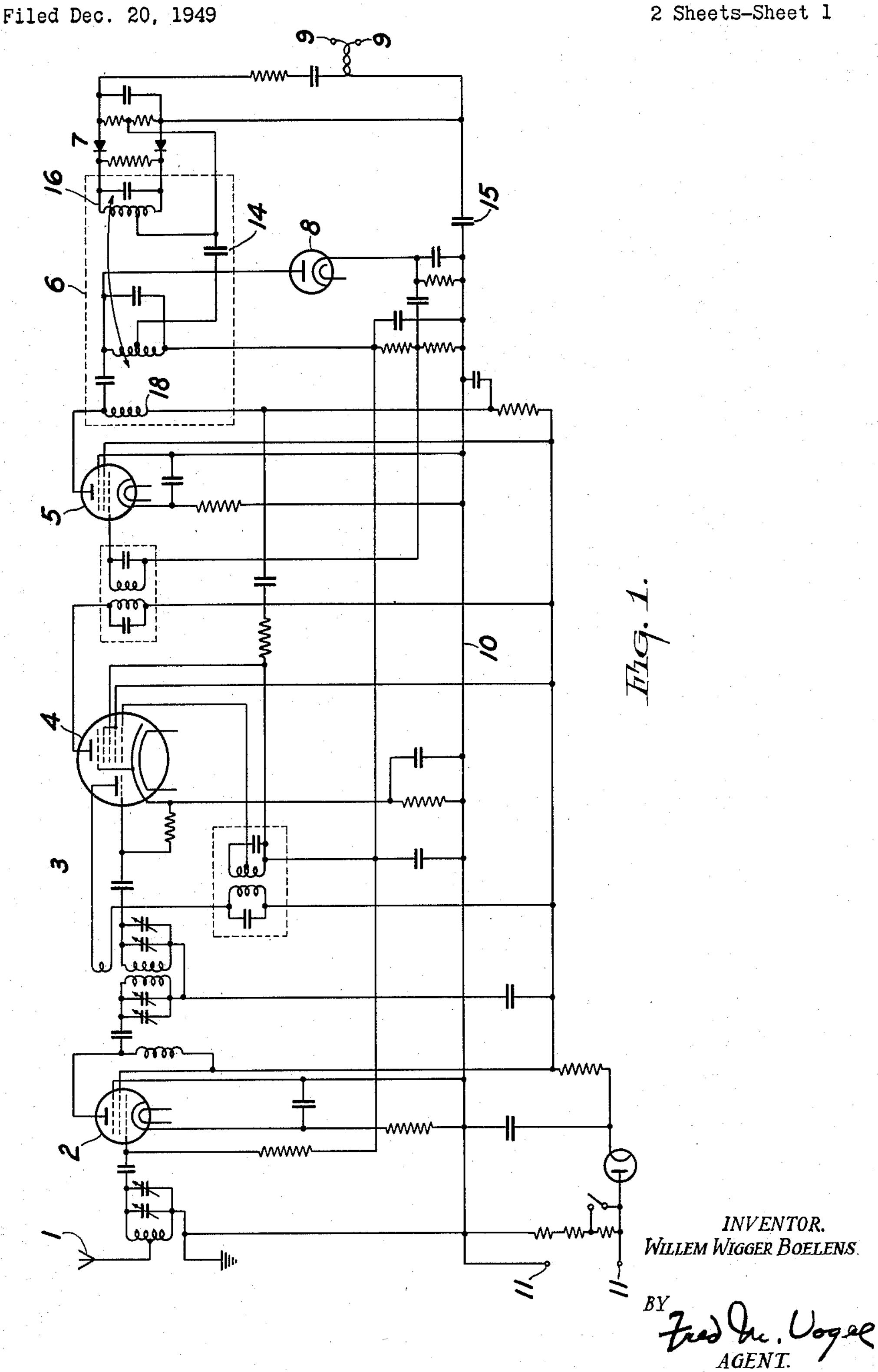
Fig. 1 is a circuit-diagram of a series apparatus, by which frequency-modulated oscillations are converted into a low-frequency output voltage, which may be supplied to the low-frequency stage of a wireless receiver.

In Fig. 1, the incoming oscillations are supplied through a signal input circuit constituted by an aerial 1, a high-frequency pre-amplifying stage 2, a mixing stage 3, which at the same time serves as a local oscillator, and two intermediate-frequency amplifying stages 4 and 5, to a frequency detector comprising a discriminator network 6 and a rectifying portion 7. The circuit furthermore comprises means for suppressing undue amplitude modulation, comprising an amplitude detector 8, the output voltage of which is supplied, in this example after reflex-amplification in the tube 5, to the tube 4, in which counter modulation of the undue amplitude modulation is produced.

The problem which is the subject matter of the invention is the manner in which the output 9, 9 of the frequency detector 6, 7 may be connected to the low-frequency stage of a wireless receiver. For this purpose a blocking transformer could be provided in cascade with the output terminals 9 of the frequency detector, so that the potential of the chassis 10 of the series apparatus relatively to that of the receiver is immaterial. As an alternative, the series apparatus could be connected to the supply mains 11 through a supply transformer, so that the chassis 10 of the series apparatus could have any arbitrary voltage. Both these methods, however, involve the aforesaid disadvantages. Furthermore blocking condensers could be provided in series with the output 9, but such condensers which, of course, are required to pass the low-frequency output oscillation of the frequency detector 6, 7, would not produce any blocking effect if, for example, the chassis of the receiver happened to be at earth potential and that of the series apparatus had the mains voltage.

Coupling elements 14, 15 are provided before the input 16 of the rectifying circuit 7 and after the anode impedance 18 of the amplifying tube 5. Consequently, they are capable of effecting D. C. blocking of the discriminator network 6 and of the "earth" lead 10 of the series-connected apparatus.

The coupling elements 14, 15, in this example, are condensers which pass intermediate-frequency oscillations but which block the low-frequency oscillations and, if necessary, the mains voltage. It is thus possible to give the chassis 10 of the series connected apparatus a potential (if desired variable) which is different from that of the chassis of the receiver, without an interference voltage being passed to the low-frequency amplifying stage of the receiver. This is due to the fact that the low-frequency blocking is provided before the rectifying portion 7 of the frequency detector of the series connected apparatus. On the other hand, however, the low-frequency blocking must be provided after the anode impedance 18 of the amplifying tube 5, i. e. if use is made, as is shown, of the amplitude detector 8, by means of which undue amplitude modulation is suppressed, the low-frequency blocking must be provided after the point at which the amplitude detector 8 is connected to the anode circuit of the amplifying tube 5.

Figure 2:
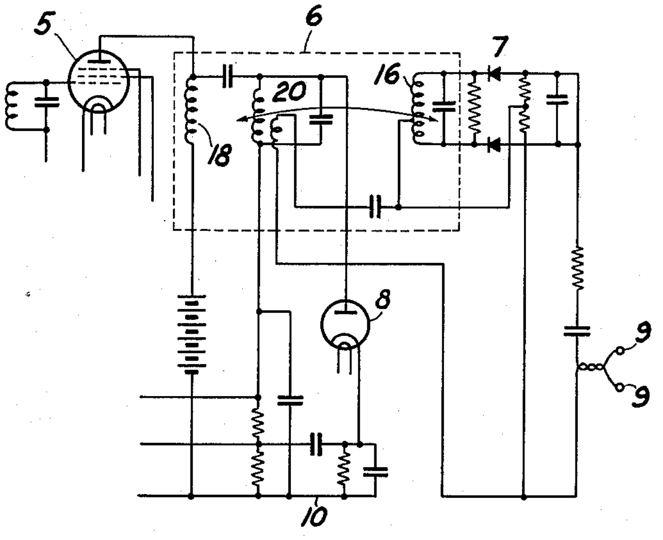
Fig. 2 is a circuit-diagram of a modified form of the last part of the circuit shown in Fig. 1

Fig. 2 shows the last portion of the circuit shown in Fig. 1 in a slightly modified form. Instead of using the blocking condensers 14 and 15, the coupling elements comprise the primary and secondary windings of a blocking transformer 20, which enables the output part of the arrangement to assume the potential of the receiver whilst nevertheless the detection process takes place in the ordinary way.

Figure 3:
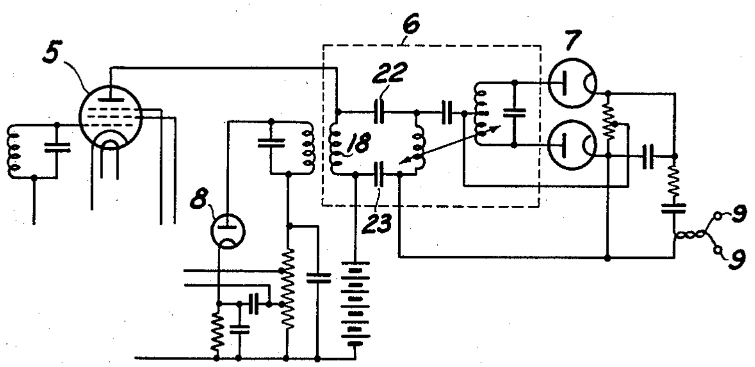
Fig. 3 is a circuit-diagram of a further modification of the same part of the circuit of Fig. 1.

Fig. 3 shows a further modification of the last part of the arrangement shown in Fig. 1, in which low-frequency blocking condensers 22, 23, as before, ensure that the output part of the arrangement is capable of having a potential which is independent of the potential of the chassis 10 of the series apparatus.

What I claim is:

An adapter for receiving frequency-modulation signals and provided with a power supply operative at a predetermined level, said adapter being intended for use with a low-frequency amplifier provided with a power supply operative at a level at variance with that of said adapter; said adapter comprising an amplifying stage responsive to said frequency-modulation signals and including an output impedance, a discriminator network for translating said frequency-modulation signals to amplitude-modulation signals and including a primary winding coupled to said output impedance and a secondary winding coupled to said primary winding, a rectifying circuit for demodulating said amplitude-modulation signals and including a pair of unidirectional elements each having one terminal connected to a respective end of said secondary windings and an output resistance interconnecting the other terminals of said elements, and a coil inductively coupled to said primary winding, one end of said coil being coupled to the electrical centers of said secondary winding and said resistance, the other end of said coil being connected to one end of said resistance.

References Cited in the file of this patent

UNITED STATES PATENTS

| | | |
|---|---|---|
| 1,894,687 | Hyland | Jan. 17, 1933 |
| 2,251,382 | Sziklai | Aug. 5, 1941 |
| 2,272,401 | Chaffee | Feb. 10, 1942 |
| 2,351,240 | Trevor | June 13, 1944 |
| 2,363,651 | Crosby | Nov. 28, 1944 |
| 2,472,301 | Koch | June 7, 1949 |